United States Patent Office 3,074,838
Patented Jan. 22, 1963

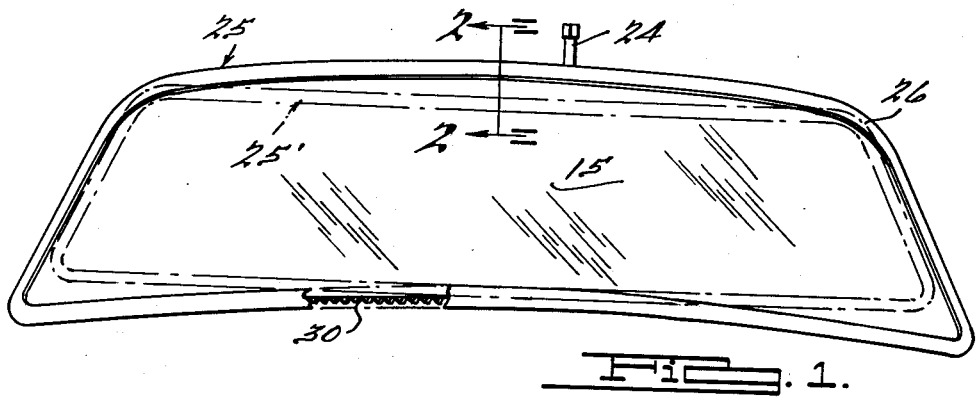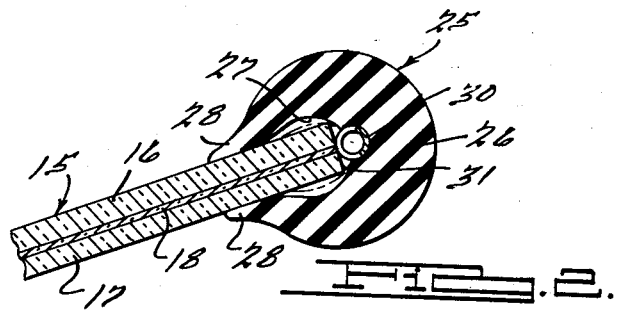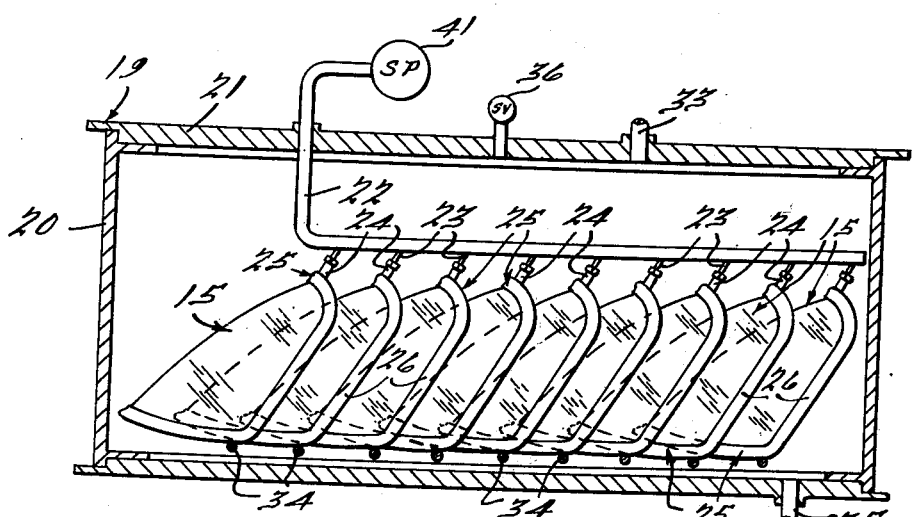

3,074,838
EVACUATION RING FOR LAMINATING PROCESS
Harvey J. Little, 2490 Middlefield, Trenton, Mich.
Filed Nov. 30, 1959, Ser. No. 856,053
2 Claims. (Cl. 156—104)

This invention relates to an evacuation or de-airing ring for use in a lamination process, particularly an evacuation ring adapted for the elimination of air or gas from between the layers of the materials that are to be pressed together to form the laminated structure. This invention is directed primarily to the incorporation in a de-airing ring of an elastic stiffening element, such as a coil spring, that will prevent collapse of the ring about the edge of the laminated structure during the evacuation process.

In the laminating of layer-like materials, such as a pair of interlayer spaced glass sheets, one of the problems that has to be overcome is the elimination of any air or gas from between the laminated layers prior to bonding of the layers into a unitary laminated structure. In the formation of a safety glass windshield wherein a plastic interlayer is placed between and bonded to a pair of glass plates, means must be provided for withdrawing or evacuating any air or gas that might otherwise be trapped between the glass layers during the laminating process. To accomplish this evacuation process it has been proposed to surround the peripheral edges of the glass sandwich with evacuation tubing, such as the tubing shown in the Drake Patent 1,870,284, and then apply a suction to the tubing at the same time that heat and pressure are applied to the exterior surfaces of the glass plates. When suction is applied to suction tubing of this type, it has been found that the vacuum created adjacent the edge of the glass laminate will cause collapse of the tubing against the end edges of the glass laminate and thereby seal off or prevent complete removal of any air or gas that may be entrapped between the plastic layer and the adjacent faces of the glass panel members. The incorporation of a rigidifying, extensible, elastic element, such as a coil spring, in the evacuation tubing, in the manner shown in FIGS. 1 and 2 of the drawings, has overcome the problem of tubing collapse previously associated with this type of laminating apparatus and has provided a noteworthy improvement in the laminating process.

FIG. 1 is a front elevational view, with portions broken away, showing an evacuation tube embodying this invention applied to the periphery of a motor vehicle windshield; the broken lines indicating the normal size of the tubing before it is stretched to permit it to be mounted about the periphery of the windshield;

FIG. 2 is an enlarged sectional elevational view taken along the line 2—2 of FIG. 1; and FIG. 3 is a sectional elevational view through an autoclave unit that houses a group of motor vehicle windshields having evacuation rings embodying this invention applied to their peripheral portions.

The reference numeral 15 represents a curved glass vehicle windshield composed of the spaced glass panels 16 and 17 that are joined together by a plastic interlayer sheet 18 arranged between and bonded thereto. It is common practice to join the spaced glass panels 16, 17 to the plastic interlayer 18 by means of heat and pressure applied to the exterior surfaces of the glass panels 16, 17 in an autoclave unit such as that indicated by the numeral 19 in FIG. 3. Autoclave unit 19 includes a tank 20 having a removable cover 21 that supports an air evacuation or suction line 22 on its interior surface. Connected to the suction line 22 are a number of quick-disconnect, self-sealing, valve controlled nozzles 23 that are adapted to be joined to the tube-like, self-sealing neck portions 24 of the de-airing rings that are each generally designated by the reference numeral 25. Suction line 22 is connected to some sort of a suction source 41 that may be a motor driven pump or the like. The cover 21 of the autoclave unit 19 preferably includes a discharge conduit 33 and a pressure safety valve 36.

The de-airing ring 25 embodying this invention is a continuous or closed ring formed of a resilient body material of rubber-like composition 26. The ring body 26 has a more or less U-shaped cross sectional configuration as clearly shown in FIG. 2. The body portion 26 includes a groove 27 that extends inwardly from the inner side edge thereof between the spaced leg portions 28. The groove 27 is adapted to receive the peripheral portions of the glass panel laminate structure 15. Mounted in the rubber body portion 26 of the ring 25 and extending longitudinally thereof adjacent the bight portion of the groove 27 is an extensible coil spring 30. The coil spring 30 is highly resistant to radial collapse and is adapted to abut against the end edge 31 of the glass laminate 15 when the de-airing ring 25 is mounted about the peripheral portions of the glass laminate 15. As can be seen from the dashed contour line in FIG. 1, indicated by the reference numeral 25', the de-airing ring 25 is normally of slightly smaller peripheral length than the periphery of the glass laminate 15 on which it is to be mounted. Accordingly, the elastic evacuation ring 25 with its longitudinally extensible reinforcing wire coil 30 must be somewhat elongated in order to mount the ring 25 about the periphery of the glass laminate 15. The extensible coil spring 30 permits this elongation of the resilient de-airing ring body portion 26 while preventing radial collapse of the ring body or bight portion 26 against the end edges 31 of the glass laminate 15 during an evacuation operation.

In carrying out a laminating process that utilizes this invention, it is usual to first form the glass panel 16, 17 to the desired shape and to then insert a plastic interlayer 18 between the glass plates 16 and 17 so as to provide the laminating or sandwich construction that is generally designated by the reference numeral 15. The next stage in the laminating process is to mount the de-airing ring 25 about the peripheral edges 31 of the laminate sandwich 15. The undersize ring 25 may be readily stretched to permit its mounting about the periphery of the oversize laminate sandwich 15 because both the ring body material 26 and the reinforcing coil spring 30 are readily extensible. In practice it has been found that the ring 25 should in its normal shape be ½ inch per foot shorter than the periphery of the glass about which it is to be mounted. The de-airing ring 25 is mounted about the periphery of the glass laminate 15 and the inherent resilience of the ring contracts the ring groove portion 27 about the end edges 31 of the glass sandwich 15 until the coil spring 30 abuts the edges 31 of the glass 15. When suction is then applied to the groove 27 in the de-airing ring 25 through the ring neck portion 24 that is connected to a quick-disconnect suction nozzle 23, all gas or air will be evacuated from the space between the glass laminates 16, 17 and the interlayer 18. This de-airing process is preferably carried on in the autoclave unit that is generally designated by the reference numeral 19 in FIG. 3. As can be seen from FIG. 3 the autoclave unit has rack bars 34 that support the glass windshield assemblies 15 in adjacent, substantially vertical positions with the de-airing rings 25 attached to the peripheral surfaces of the windshield assemblies. The tube-like neck portions 24 of the de-airing rings 25 are connected to the self-sealing, quick-disconnect nozzles 23 that depend from the suction line header 22. While the air is being evacuated from between the glass layers 16, 17 of the glass sandwich 15 through the de-airing rings 25 and suction line 22, steam or some other hot pressurized fluid is supplied to the interior of the autoclave tank 20 through the supply conduit 35. The heat and pressure from the fluid contained within the autoclave unit 19 softens the plastic interlayer 18 and applies external pressure to the glass panels 16, 17 so as to effect the bonding of the glass layers 16, 17 to the interlayer 18. The external pressure on the panels 16, 17 further assists in squeezing any entrapped air from the space between the glass layers 16, 17 at the same time that the suction conduit 22 is withdrawing air therefrom through the conduit formed by the hollow coil spring 30 that runs along the end edges 31 of the glass laminate 15. The process heretofore described can be utilized for either edge tacking or completely laminating the panels 16, 17.

The advantages resulting from the use of an extensible, continuous or closed de-airing ring of the disclosed type are thought to be rather evident. First, such a ring can be used on a large number of different size and different shape laminate structures because of its flexibility and elasticity. Second, the ring provides a protective shield around the edges of the windshield assembly to prevent chipping or cracking of the glass assemblies during handling in the laminating process. Third, the rings are labor saving in that they can be quickly and easily applied to and removed from the peripheral portions of the glass laminates 15. Fourth, they are much less expensive than a tacking bag or any other types of equipment heretofore used for de-airing processes. Fifth, the incorporation of a longitudinally extensible, rigidifying tube in the ring body portion adjacent the groove thereon insures the maintenance of a free suction conduit about the laminate periphery so that a complete evacuation process can be achieved. Sixth, the use of a hollow, extensible, rigidifying means 30 in the ring body portion 26 not only prevents complete collapse of the ring groove 27, but adds the interior hollow area of the rigidifying means 30 to the groove area 27 to provide an enlarged suction conduit to insure complete evacuation of the space between the panels 16, 17.

While only a continuous coil spring 30 has been shown as the longitudinally extensible rigidifying means for preventing radial collapse of the ring body portion 26 during the evacuation process, still, it is considered to be within the teachings of this invention to substitute for the continuous coil spring 30 any mechanical equivalent such as closely spaced sections of coil springs or closely spaced sections of relatively stiff rope or cording or the like, or spaced sections of rigid tubing, or closely spaced rigid rings located along the tube groove 27 and extending transversely thereof. It is the incorporation of some form of rigidifying means in the ring body portion that will prevent radial collapse of the de-airing ring under suction while permitting radial flexing and longitudinal extensibility of the ring the comprises this inventive concept.

While this invention has been disclosed in combination with an autoclave unit 19 wherein the heating and pressing of the plastic interlayer occurs while the evacuation process is being carried on through the ring 25, still, it is to be pointed out that the evacuation ring 25 can be used at any time and in any surroundings to de-air the laminate 15 and then the ring enclosed assembly 15 can be disconnected from the suction nozzles 23 and the de-aired laminate 15 stored or moved to some other position for a subsequent operation.

I claim:
1. An evacuation ring adapted to be mounted around the periphery of a laminate structure comprising an impervious elastic ring of substantially U-shaped cross section shaped to be stretch mounted on and to enclose the end edge portions of said laminate, said ring having a groove portion therein sealingly receiving the laminate periphery with the groove bottom in open communication with the end edge portions of said laminate, and integral rigidifying means carried by and positioned interiorly of the ring groove to substantially space the groove bottom from the end edges of the laminate and resisting radial collapse of the ring against the laminate end edge portions while permitting longitudinal extension of the ring, said rigidifying means extending longitudinally of the ring and arranged to abut the end edges of the laminate on which the ring is mounted and comprising a coil spring member that provides a suction conduit interiorly of and adjacent said ring groove portion.

2. An evacuation ring for a laminated structure including a pair of glass panels with a plastic interlayer therebetween, said ring being adapted to be connected to a suction source and to be mounted around the peripheral end edges of the laminate structure, comprising a continuous ring of impervious elastic material having a continuous groove in its inner peripheral surface adapted to surround and sealingly receive the peripheral portions of said laminate, said groove having a bottom providing a continuous conduit in open communication with the end edges of the laminate throughout the length thereof, and rigidifying means for said ring comprising an integral extensible means carried by and extending longitudinally of the ring adjacent said groove bottom to substantially space the groove bottom from the end edges of the laminate and prevent collapse of the ring against the end edges of the laminate, said rigidifying means comprising an extensible coil spring arranged in open communication with said ring groove and the abutting end edges of the glass panels and providing a continuously open suction conduit through the ring to the laminate end edges.

References Cited in the file of this patent
UNITED STATES PATENTS

| | | |
|---|---|---|
| 2,308,453 | Potchen et al. | Jan. 12, 1943 |
| 2,713,378 | Nadler et al. | July 19, 1955 |

FOREIGN PATENTS

| | | |
|---|---|---|
| 559,783 | Canada | July 1, 1958 |